(12) United States Patent
Bell et al.

(10) Patent No.: US 7,757,703 B2
(45) Date of Patent: Jul. 20, 2010

(54) DEVICE FOR REGULATING PRESSURE

(75) Inventors: Thomas M. Bell, Houston, TX (US); Scott D. Ward, Houston, TX (US)

(73) Assignee: Cameron International Corporation, Houston, TX (US)

( * ) Notice: Subject to any disclaimer, the term of this patent is extended or adjusted under 35 U.S.C. 154(b) by 185 days.

(21) Appl. No.: 11/485,102

(22) Filed: Jul. 12, 2006

(65) Prior Publication Data

US 2008/0011360 A1    Jan. 17, 2008

(51) Int. Cl.
*G05D 16/10* (2006.01)
(52) U.S. Cl. ............... 137/116.3; 137/505.11; 137/505.18; 137/505.26
(58) Field of Classification Search ........ 137/505, 137/505.11, 505.18, 505.26, 116.3, 116.5, 137/494; 251/176, 326, 186, 205
See application file for complete search history.

(56) References Cited

U.S. PATENT DOCUMENTS

| | | | | |
|---|---|---|---|---|
| 618,903 A * | 2/1899 | Prince | ............... | 137/115.23 |
| 975,838 A * | 11/1910 | Derby | ............... | 137/505.11 |
| 1,233,885 A * | 7/1917 | Kuenhold | ............... | 137/505.11 |
| 1,654,642 A * | 1/1928 | Geissinger | ............... | 251/186 |
| 2,292,871 A * | 8/1942 | Dunn | ............... | 137/218 |
| 2,440,961 A * | 5/1948 | Link | ............... | 60/465 |
| 2,887,123 A | 5/1959 | Becker | | |
| 2,918,081 A * | 12/1959 | Lauer, Jr. | ............... | 137/505.11 |
| 3,103,230 A * | 9/1963 | Kutsche | ............... | 137/116.3 |
| 3,211,175 A * | 10/1965 | Replogle | ............... | 137/493 |
| 3,305,208 A * | 2/1967 | Bredtschneider | ............... | 251/176 |
| 3,785,398 A * | 1/1974 | Lonnemo et al. | ............ | 137/488 |
| 4,133,343 A | 1/1979 | Carroll | | |
| 4,424,738 A | 1/1984 | Leighton | | |
| 4,456,028 A * | 6/1984 | Watson | ............... | 251/176 |
| 4,493,335 A | 1/1985 | Watson | | |
| 4,506,693 A | 3/1985 | Acker | | |
| 5,257,646 A * | 11/1993 | Meyer | ............... | 137/505.25 |
| 5,307,834 A * | 5/1994 | Tatarek-Gintowt et al. | ....... | 137/505.11 |
| 5,522,421 A * | 6/1996 | Holt et al. | ............... | 137/505.22 |
| 5,678,602 A * | 10/1997 | Cannet et al. | ............ | 137/505.25 |
| 6,176,256 B1 | 1/2001 | Nakajima et al. | | |
| 6,334,633 B1 | 1/2002 | Nguyen et al. | | |
| 6,651,696 B2 * | 11/2003 | Hope et al. | ............... | 137/540 |
| 7,000,890 B2 | 2/2006 | Bell et al. | | |
| 2002/0066562 A1 | 6/2002 | Nice | | |
| 2005/0151099 A1 * | 7/2005 | Bell et al. | ............... | 251/1.1 |

OTHER PUBLICATIONS

Bell et al., U.S. Appl. No. 11/485,113, filed July 12, 2006, entitled "Pressure Regulating Device and System."

* cited by examiner

*Primary Examiner*—Stephen Hepperle
(74) *Attorney, Agent, or Firm*—Fletcher Yoder P.C.

(57) ABSTRACT

A pressure regulator is provided. In one embodiment, the pressure regulator includes a body having an internal cavity for receiving a pressurized medium and inlet and outlet ports that enable a pressurized medium to enter the internal cavity at a first pressure and exit at a second pressure. The exemplary pressure regulator also includes a control piston disposed within the internal cavity that is configured to move in response to a change in pressure within the internal cavity. The pressure regulator of this embodiment also includes a damping feature within the internal cavity that is configured to oppose the movement of the control piston. Other embodiments of pressure regulators and systems are also provided.

7 Claims, 9 Drawing Sheets

DEVICE FOR REGULATING PRESSURE

FIELD OF THE INVENTION

The present invention relates generally to pressure regulation within a system. More particularly, the present invention relates to a novel pressure regulating device for such systems.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, supplies of oil and natural gas have a profound effect on modern economies and civilizations. Devices and systems that depend on oil and natural gas are ubiquitous. For instance, oil and natural gas are used for fuel in a wide variety of vehicles, such as cars, airplanes, boats, and the like. Further, oil and natural gas are frequently used to heat homes during winter, to generate electricity, and to manufacture an astonishing array of everyday products.

In order to meet the demand for these resources, companies often spend a significant amount of time and money searching for and extracting oil, natural gas, and other subterranean resources from the earth. Particularly, once a desired resource is discovered below the surface of the earth, a drilling system is often employed to access and extract the resource. These drilling systems may be located onshore or offshore depending on the location of a desired resource. Further, such systems include a wide array of components, such as valves, that control drilling or extraction operations. Often, some of these components are controlled through pressure variation, such as that provided by a hydraulic control system.

In some such systems, a hydraulic pressure regulator is used to provide a fluid at a regulated pressure to downstream components, such as solenoid valves. One common type of hydraulic pressure regulator has a control piston that moves back and forth to open and close both supply ports and vent ports of the regulator in response to the magnitude of pressure within the regulator. As the functionality of an entire drilling system may depend on proper operation of the hydraulic pressure regulator, it is generally desirable to employ a pressure regulator that is both durable and sensitive to changes in pressure. Further, when such a regulator is employed in a subsea application, halting production from the system to replace an underwater pressure regulator may be particularly undesirable.

There is a need, therefore, for a pressure regulator that provides increased sensitivity to changes in pressure within the regulator and increased reliability.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present invention generally relate to a novel pressure regulator. In certain embodiments, the pressure regulator is a hydraulic pressure regulator configured for use in controlling components of a drilling system. In one embodiment, the exemplary pressure regulator has a plurality of internal pistons, including two pistons that operate independently of one another to open and close respective ports of the regulator. In another embodiment, the pressure regulator includes an internal damping feature for enhancing stability of the pressure regulator. In an additional embodiment, the pressure regulator includes a seal plate having an aperture that is partially shaped in accordance with the geometry of a respective portion of a mating seal ring. In yet another embodiment, the pressure regulator may include a torque-reducing adjustment mechanism that allows adjustment in the amount of biasing force applied to a piston within the pressure regulator by a load spring without applying a substantial rotational force to the load spring. In a further embodiment, the pressure regulator includes an apparatus for venting control fluid out of a main body of the pressure regulator, through a conduit, and into a separate chamber within the pressure regulator to flush contaminants, liquids, or otherwise undesirable materials from the separate chamber. Additional embodiments of the present invention may also include various combinations of the features noted above.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to the claimed subject matter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Figure 1:
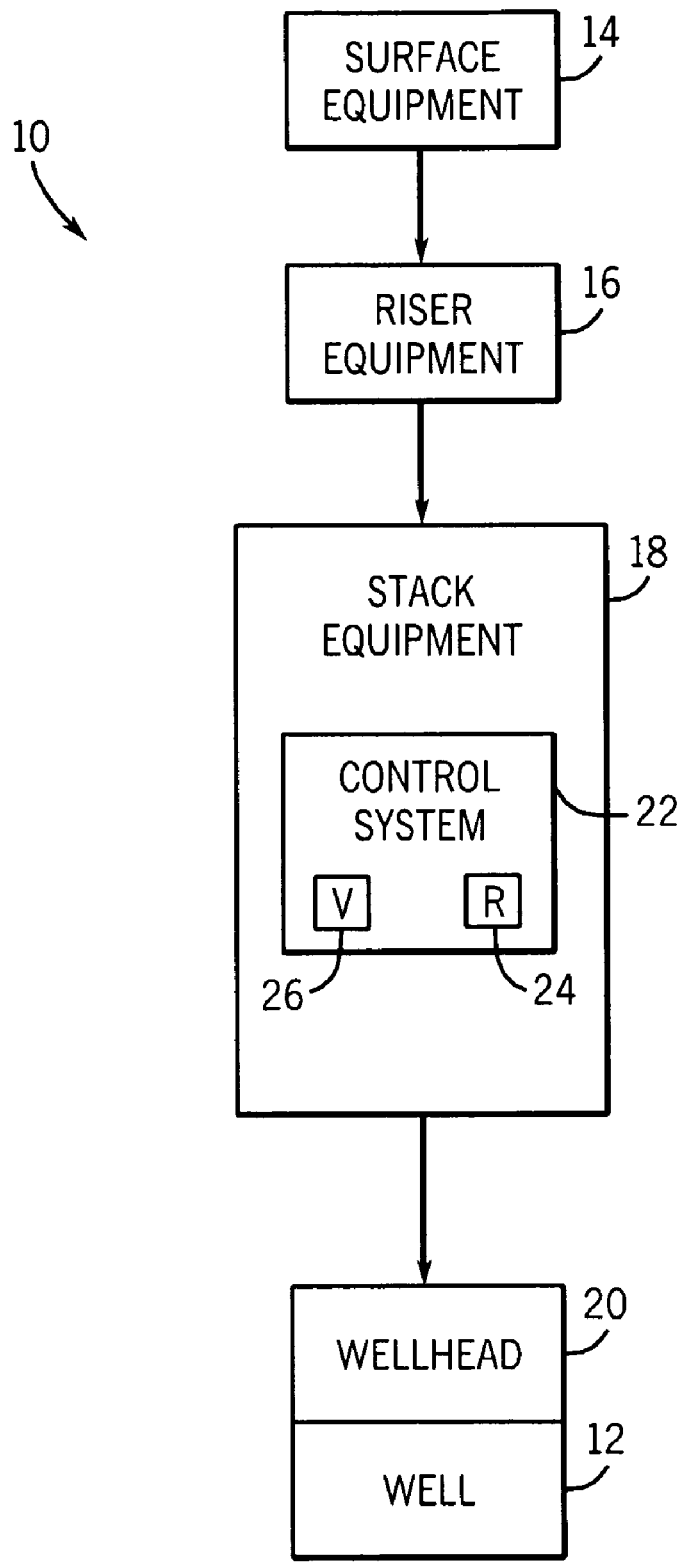
FIG. 1 is a block diagram of an exemplary resource extraction system having a pressure regulator in accordance with one embodiment of the present invention.

Turning now to the present figures, an exemplary drilling system 10 is illustrated in FIG. 1 in accordance with one embodiment of the present invention. Notably, the exemplary system 10 facilitates extraction of a resource, such as oil or natural gas, from a well 12. The exemplary system 10 includes a variety of equipment, including surface equipment 14, riser equipment 16, and stack equipment 18, for extracting the resource from the well 12 via a wellhead 20. The exemplary system 10 may be employed in a variety of drilling or extraction applications, including onshore and offshore, i.e., subsea, drilling applications. In one subsea resource extraction application, the surface equipment 14 is mounted to a drilling rig above the surface of the water, the stack equipment 18 is coupled to the wellhead 20 proximate the sea floor, and the various equipment 14 and 18 is coupled to one another via the riser equipment 16.

As will be appreciated, the surface equipment 14 may include a variety of devices and systems, such as pumps, power supplies, cable and hose reels, control units, a diverter, a gimbal, a spider, and the like. Similarly, the riser equipment 16 may also include a variety of components, such as riser joints, fill valves, control units, and a pressure-temperature transducer, to name but a few. The riser equipment 16 facilitates transmission of the extracted resource to the surface equipment 14 from the stack equipment 18 and the well 12.

The stack equipment 18 also includes a number of components, such as blowout preventers and/or production or "Christmas" trees, for extracting the desired resource from the wellhead 20 and transmitting it to the surface equipment 14 and the riser equipment 16. In the presently illustrated embodiment, operation of the stack equipment 18 is controlled by an exemplary control system 22. The exemplary control system 22 includes a pressure regulator 24 and a plurality of valves 26 that control flow through the system 10. In some embodiments, one or more of the plurality of valves compose a portion of a blowout preventer or Christmas tree.

Further, in an exemplary embodiment, the pressure regulator 24 is a hydraulic pressure regulator and the plurality of valves 26 includes solenoid valves. As will be appreciated, valves 26 may be configured with a specific pressure rating, such as 3,000 psi. Often, in hydraulic systems, an initial supply pressure is provided to the control system 22, such as from a bank of accumulator tanks, that is higher than the pressure rating of various system components, such as valves 26, to facilitate maintenance of adequate pressure to the system components even during periods of high usage. In the exemplary system 10, the pressure regulator 24 enables management of the supply pressure to deliver a regulated pressure to downstream components, such as valves 26. While the pressure regulator 24 of the presently illustrated embodiment is a component of the stack equipment 18, it will be appreciated that, in other embodiments, the pressure regulator 24 may be disposed in other portions of the system 10, such as a component of the surface equipment 14, in full accordance with the present techniques. Additionally, certain embodiments may include multiple pressure regulators 24, which may be configured to receive and transmit control fluid at the same respective pressure levels as each other or, alternatively, such that two pressure regulators 24 each receive and/or transmit fluids at pressure levels that are different between the two regulators 24.

Figure 2:
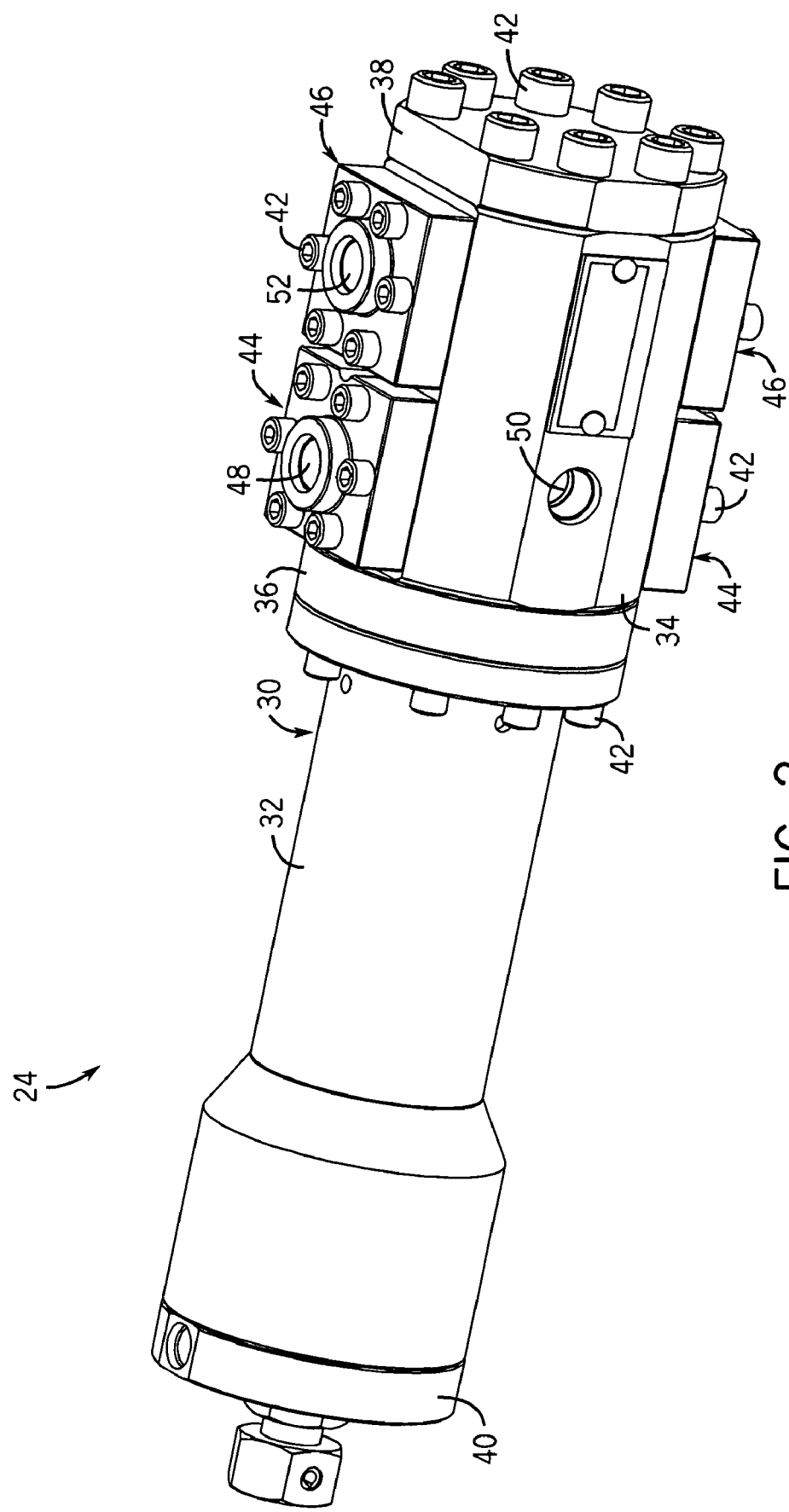
FIG. 2 is a perspective view of an exemplary pressure regulator in accordance with one embodiment of the present invention.

An exemplary pressure regulator 24 is illustrated in FIG. 2. The pressure regulator 24 includes an elongated housing or body 30 having an upper housing 32 and a lower housing 34 for receiving various internal components, as discussed in greater detail below. Upper and lower end caps 36 and 38 are secured to the lower housing 34, and an end cap 40 is secured to the upper housing 32, to enclose the aforementioned internal components within the body 30. In the presently illustrated embodiment, the end caps 36 and 38 are secured to the lower housing 34 via a plurality of fasteners 42. While fasteners 42 of the presently illustrated embodiment are bolts that pass through the end caps 36 and 38 and into the lower housing 34, it should be noted that the end caps 36 and 38 may be secured to the lower housing 34 in a variety of other manners, including the use of latches, other mechanical fasteners, magnets, adhesives, welding, or any other suitable technique.

The pressure regulator 24 also includes a pair of supply assemblies 44 disposed on opposite sides of the lower housing 34, and a pair of vent assemblies 46, which are also disposed on opposite sides of the lower housing 34 from one another. The supply and vent assemblies 44 and 46 may be secured to the lower housing 34 in any suitable fashion, such as by fasteners 42. While the exemplary pressure regulator 24 includes a pair of both supply pressure assemblies 44 and vent pressure assemblies 46, it should be noted that a different number of such assemblies may instead be employed in full accordance with the present techniques.

During operation, a control medium at a first pressure, such as 5,000 psi, may enter the pressure regulator 24 through the supply ports 48 of the supply assemblies 44, and the control medium may be output at a second, regulated pressure, such as 3,000 psi, via an regulated pressure outlet port 50 disposed in a side of the lower housing 34. Additionally, if the pressure inside the regulator 24 exceeds a certain threshold, the control medium may be vented from the regulator 24 through the vent ports 52 of the vent assemblies 46. In the presently illustrated embodiment, the pressure regulator 24 is a hydraulic pressure regulator and the control medium includes hydraulic fluid. In other embodiments, however, the control medium may be some other material, such as a pressurized gas. Consequently, while the instant description of the illustrated embodiments may refer to a control fluid, it will be appreciated that such description may apply to a control liquid in a hydraulic pressure regulator in accordance with one embodiment of the present invention, and does not necessarily preclude the use of a gaseous control medium in an alternative embodiment.

Figure 3:
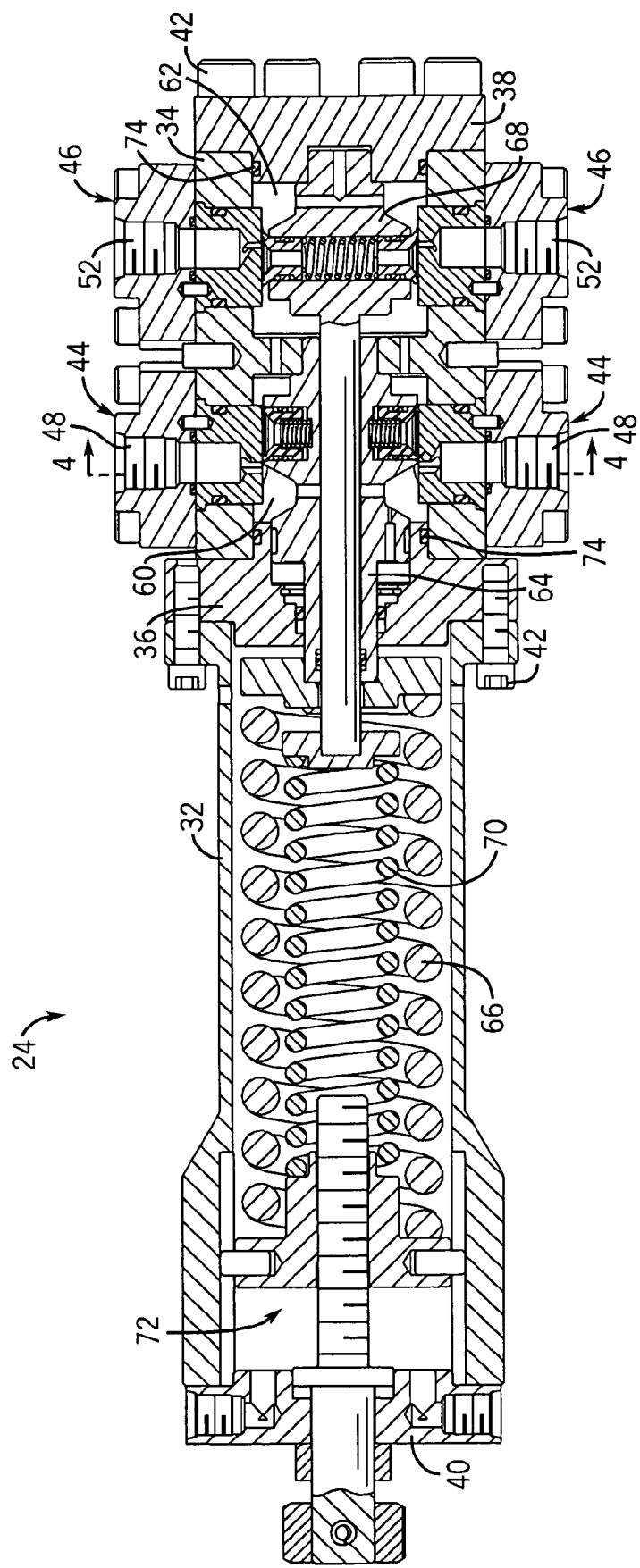
FIG. 3 is a cross-sectional view of the pressure regulator of FIG. 2, illustrating exemplary internal components of the pressure regulator in accordance with one embodiment of the present invention.
Figure 4:
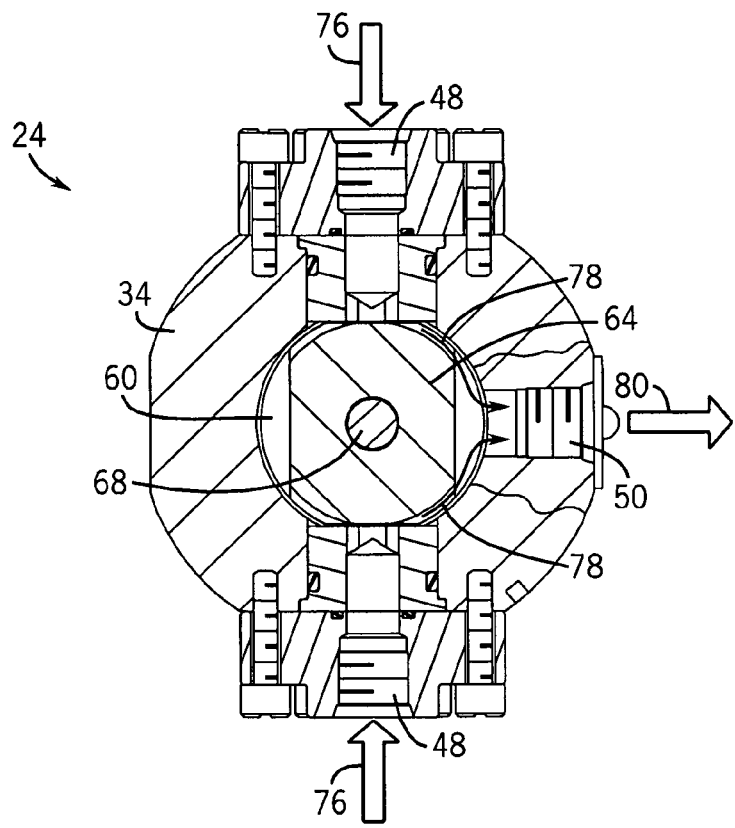
FIG. 4 is an axial cross-sectional view of the pressure regulator of FIG. 3.

The internal operation of the exemplary regulator 24 may be better understood with reference to FIGS. 3 and 4, which are sectional views of the exemplary regulator 24 illustrated in FIG. 2. Notably, as illustrated in FIG. 3, the lower housing 34 generally defines two internal chambers: a supply chamber 60 and a vent chamber 62. A supply piston 64 is disposed within the supply chamber 60, extends through the upper end cap 36, and is biased by a supply load spring 66 disposed within the upper housing 32. Similarly, a vent piston 68 is disposed within the vent chamber 62, extends through the supply piston 64 and the upper end cap 36, and is biased by a vent load spring 70. In the presently illustrated embodiment, the vent piston 68 extends through the supply piston 64 and the load springs 66 and 70 are disposed concentric to one another in the same portion of the upper housing 32. However, in other embodiments, the springs 66 and 70 may be located apart from one another, and the vent piston 68 may have a configuration in which it does not extend through the supply piston 64 or the upper end cap 36 in full accordance with the present techniques.

As discussed in greater detail below, pressure within the supply and vent chambers 60 and 62 may apply a thrust force to the supply piston 64 and/or the vent piston 68 that acts against the biasing force provided by springs 66 and 70, respectively, such that supply ports 48 and vent ports 52 may be opened and closed. The biasing force supplied by springs 66 and 70 can be modified via a spring load adjustment mechanism 72 disposed at one end of the upper housing 32 and discussed in greater detail below. As may be appreciated, the exemplary regulator 24 includes various seals or O-rings 74, disposed between the components to maintain pressure within the regulator 24 and reduce or prevent leakage of materials, such as a control fluid, from or into the interior of regulator 24.

An axial sectional view of the exemplary regulator 24 is provided in FIG. 4. During operation, when the supply ports 48 are open, the control medium or fluid enters the supply ports 48, as generally indicated by arrows 76. This control fluid is routed into the supply chamber 60 and about the supply piston 64, as generally indicated by arrows 78. The control fluid may then be output at a regulated pressure to downstream components through the outlet port 50, as generally indicated by arrow 80.

Figure 5:
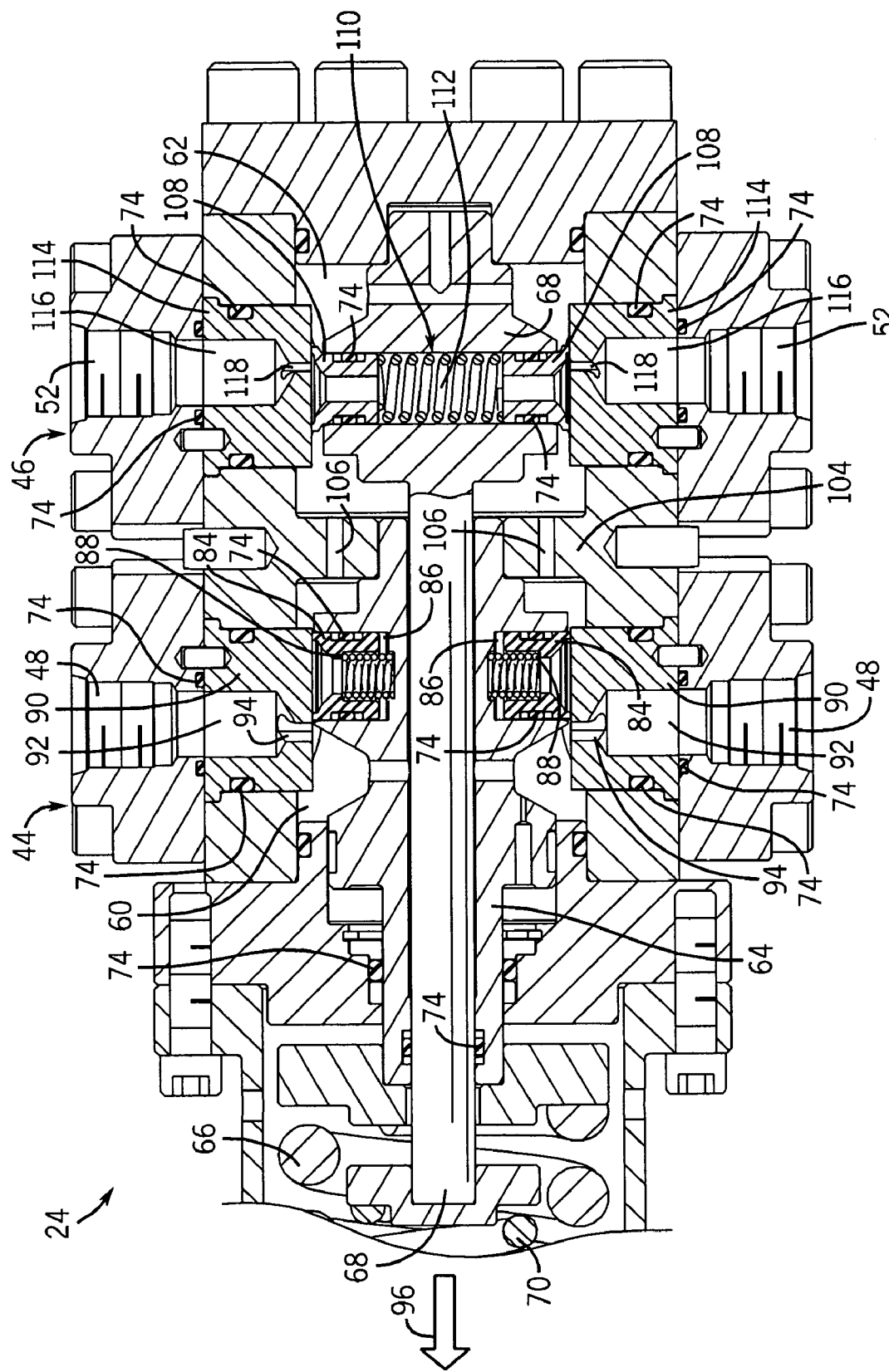
FIG. 5 is a detailed sectional view of the pressure regulator of FIG. 3 including two internal pistons in accordance with one embodiment of the present invention.
Figure 6:
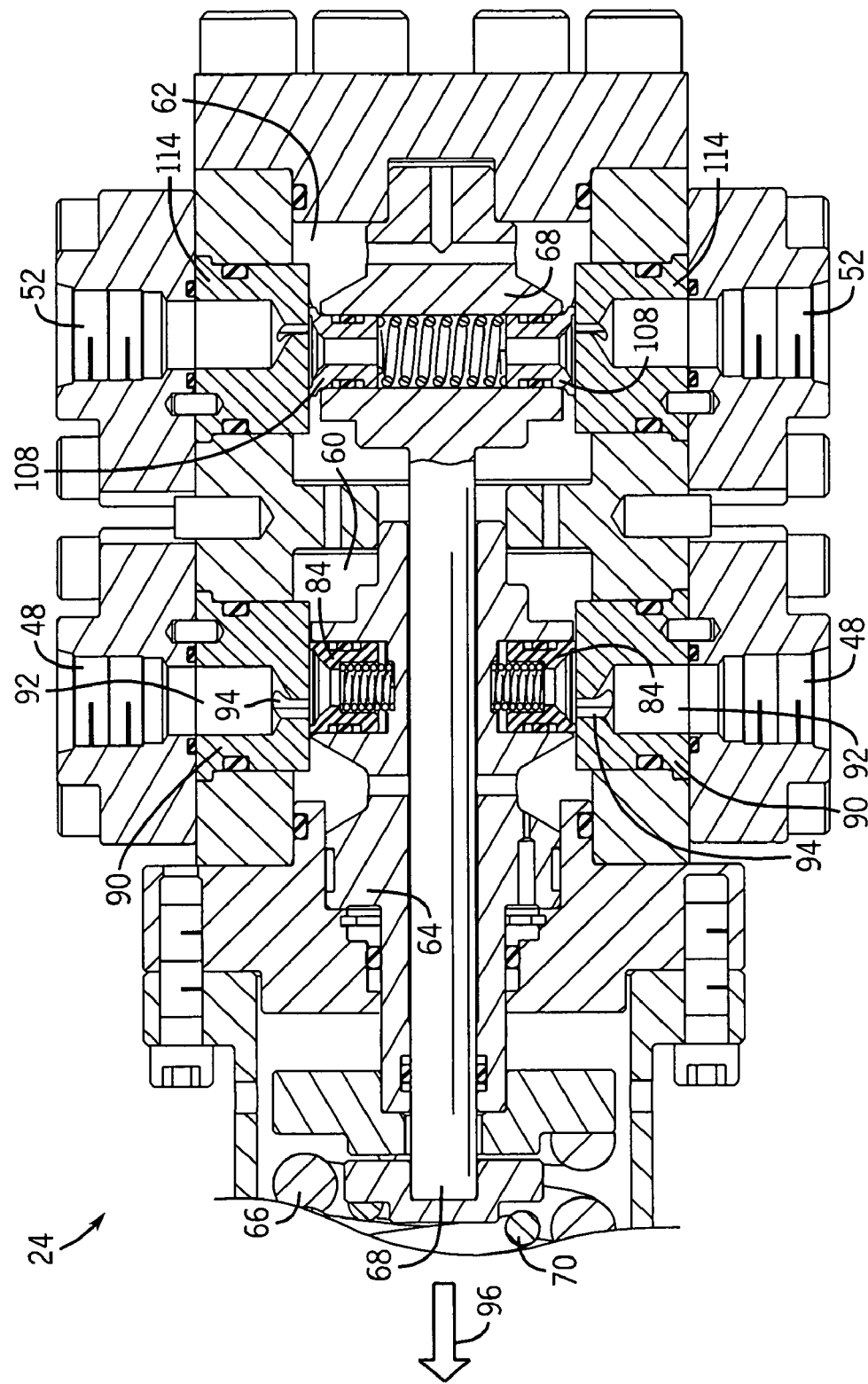
FIG. 6 is another detailed sectional view of the pressure regulator of FIG. 3, illustrating the closing of supply ports of the pressure regulator in accordance with one embodiment of the present invention.
Figure 7:
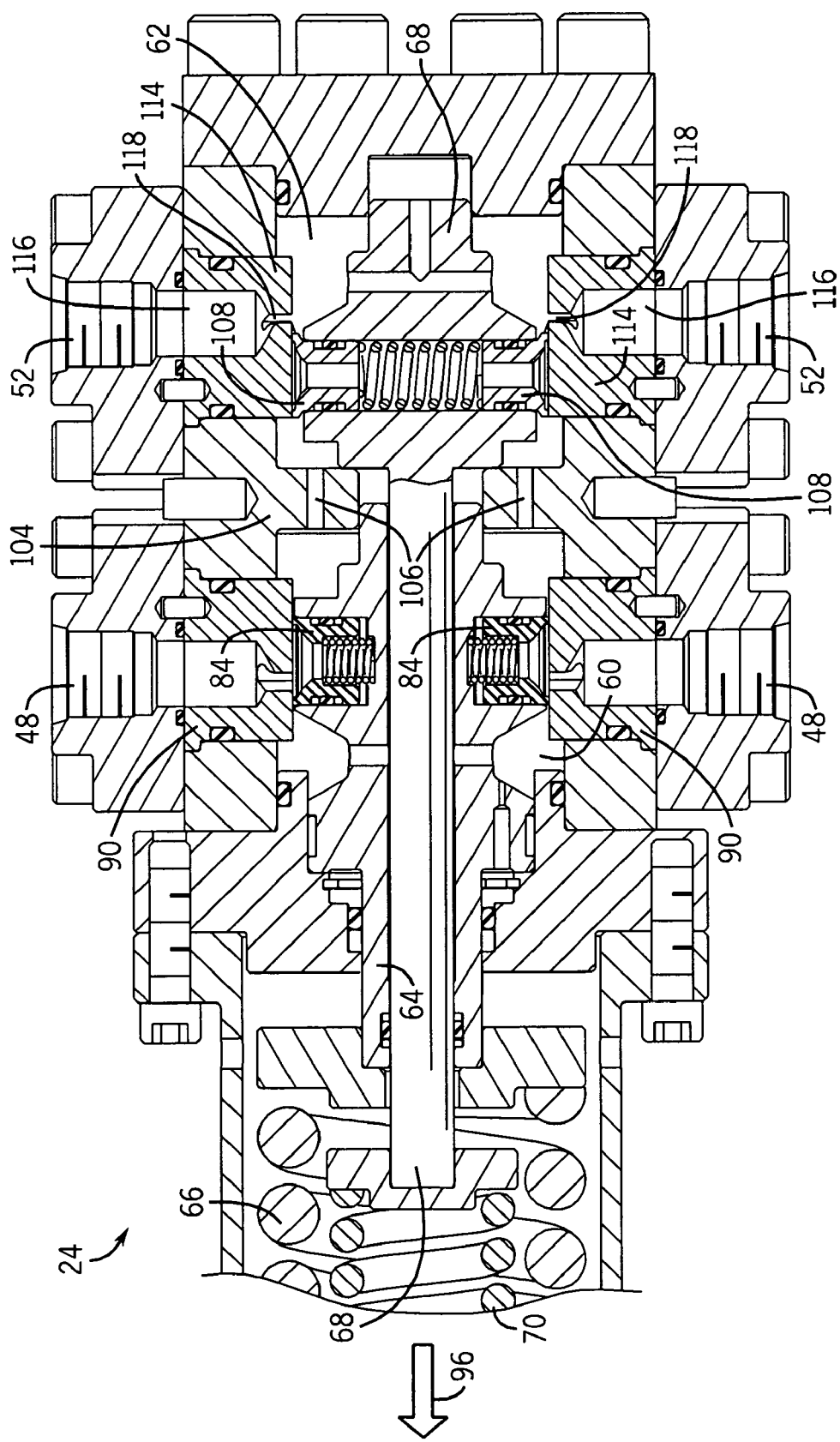
FIG. 7 is an additional detailed sectional view of the pressure regulator of FIG. 3, illustrating the opening of vent ports of the pressure regulator in accordance with one embodiment of the present invention.

The opening and closing of the supply ports 48 and vent ports 52 may be better understood with reference to the detailed sectional views of FIGS. 5-7. In the presently illustrated embodiment, the flow of control fluid or medium into the regulator 24 through the supply ports 48 is generally controlled by motion of the supply piston 64. More particularly, in one embodiment, supply shear seal rings 84 are disposed within recesses 86 of the supply piston 64. Springs 88 are also disposed within the recesses 86 to bias the supply shear seal rings 84 against supply seal plates 90 of the supply assembly 44. The exemplary supply seal plates 90 include a first fluid passageway 92 and a second fluid passageway 94 that facilitate flow of a control fluid through supply ports 48 to the supply chamber 60.

A control fluid entering the supply chamber 60 may pass to the vent chamber 62 through a separating shoulder 104 via a plurality of pressure transfer ports 106. In the present embodiment, vent shear seal rings 108 are disposed within a recess 110 of the vent piston 68. The vent shear seal rings 108 are similarly biased by a spring 112 against a pair of vent seal plates 114. The vent seal plates 114 also include first and second fluid passageways 116 and 118, respectively, which enable fluid to be vented from the vent chamber 62 through the vent ports 52. In the presently illustrated embodiment, the vent seal rings 108 are of a different size than the supply seal rings 84. Further, the exemplary second passageways 94 and 118 of the seal plates 90 and 114, respectively, are also of different sizes than one another and are based on the particular sizes and geometries of the seal rings 84 and 108, as discussed in greater detail below.

An initial operating state is depicted in FIG. 5, in which the supply ports 48 are open and the vent ports 52 are closed with respect to the interior of the pressure regulator 24. This configuration allows the control medium to enter the pressure regulator 24 through the supply ports 48 and exit through the regulated pressure outlet port 50, as discussed above. As will be appreciated, hydraulic or pneumatic pressure within the supply chamber 60 results in a thrust force applied to the supply piston 64 in the direction generally indicated by arrow 96. However, the biasing force of supply load spring 66, the friction between the shear seal rings 84 and seal plates 90, and the friction attributable to the seal 74 between the supply piston 64 and the upper end cap 36 each oppose movement of the piston in the direction indicated by arrow 96. If the thrust generated by the pressure within the supply chamber 60 is below a first pressure threshold (which is generally dictated by the frictional and biasing forces noted above), the supply ports 48 remain open to allow additional control fluid to enter the pressure regulator 24 and exit through the outlet port 50. In an exemplary embodiment, the first pressure threshold may be substantially equal to a desired operating pressure of downstream components, such as 3,000 psi.

As the pressure downstream and within the regulator 24 increases and approaches the first pressure threshold, the hydraulic force on supply piston 64 becomes sufficient to move the supply piston 64 in the direction indicated by arrow 96 and toward the closed position generally illustrated in FIG. 6. Particularly, in the presently illustrated embodiment, the supply load spring 66, the seal rings 84, and the supply piston 64 are configured such that the seal rings 84 are moved into a fully closed position, in which the seal rings 84 are disposed over the entirety of the second fluid passageway 94, when the pressure within the supply chamber 60 reaches and/or exceeds the first pressure threshold. At this point during operation, the pressure regulator may be considered to be in a state of equilibrium, in which both the supply and vent ports 48 and 52 are closed and no control medium flows through the regulator 24. In other words, at this operational point, the pressure inside the supply and vent chambers 60 and 62 is above the first pressure threshold, causing the supply piston 64 to move into a closed position, but is not sufficient to transmit a thrust to the vent piston 68 that results in opening of the vent ports 52.

As may be appreciated, as the pressure within the pressure regulator 24 continues to increase beyond the first pressure threshold, the thrust applied to the vent piston 68 by the internal pressure also increases, causing the vent piston 68 to move in the direction indicated by arrow 96. As the internal pressure reaches a second pressure threshold, the vent piston 68 and vent seal rings 108 are moved into an open position, as generally illustrated in FIG. 7, which allows control fluid within the vent chamber 62 to be vented out of the pressure regulator 24 via vent ports 52.

It will be noted that, in the presently illustrated embodiment, the supply piston 64 and the vent piston 68 may operate independent of one another. That is, movement of the supply piston 64 and supply seal rings 84 to control flow through the supply ports 48 is independent of the movement of vent piston 68 and vent seal rings 108 that generally control flow through the vent ports 52. The independent operation of the supply and vent piston 64 and 68 enable the use of two separate load springs 66 and 70 that may be specifically configured for a desired range of regulated and vent pressures, respectively. Further, the mechanical independence of supply piston 64 and vent piston 68 reduces the frictional forces that act against the thrust force applied to each piston by the internal pressure of the pressure regulator 24, and thereby enhances the sensitivity of the pressure regulator 24.

In other words, while a single piston carrying both seal rings 84 and seal rings 108 would experience frictional forces attributable to both sets of the seal rings 84 and 108, the supply and vent pistons 64 and 68 in the presently illustrated embodiment are subjected to only the frictional force attributed to their own respective seal rings 84 and 108 (in addition to any friction created by other components, such as seals 74). Consequently, the supply piston 64 and the vent piston 68 are each more responsive to a sudden increase or decrease in the pressure within the supply chamber 60 and the vent chamber 62. For example, in the general state of equilibrium illustrated in FIG. 6, a sudden increase in pressure within the regulator body 30, such as that caused by a sudden closing of a downstream valve, causes only the vent piston 68 and its associated seal rings 108 to be moved into the open position generally illustrated in FIG. 7, to relieve the pressure buildup within the pressure regulator 24. Similarly, the pressure regulator 24 may more quickly open the supply ports 48, such as by moving only the supply piston 64 and the seal rings 84, to allow additional control fluid to enter the supply chamber 60 to compensate for a sudden drop in internal pressure.

Figure 8:
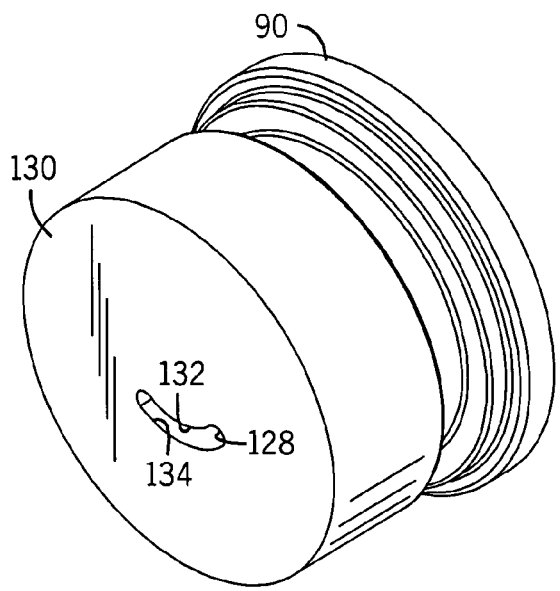
FIG. 8 is a perspective view of an exemplary seal plate of the pressure regulator of FIG. 3 in accordance with one embodiment of the present invention.
Figure 9:
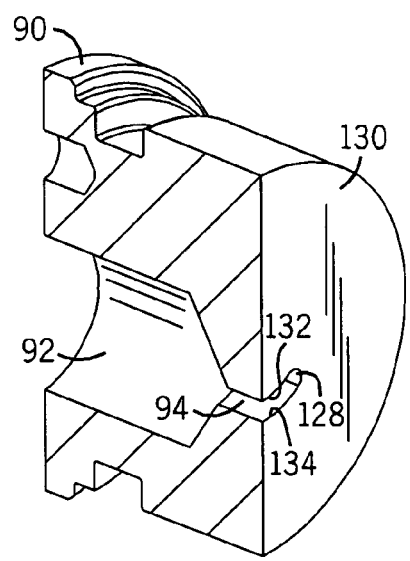
FIG. 9 is a sectional view of the exemplary seal plate of FIG. 8.

In certain embodiments, the supply seal plates 90 may be specifically configured based on the geometries of their respective seal rings 84. For instance, in the embodiment illustrated in FIGS. 8 and 9, an exemplary supply seal plate 90 includes an arcuate opening or aperture 128 defined by the exit of the second passageway 94 at a surface 130 of the supply seal ring 90. As will be appreciated, a shear supply seal ring 84 (FIG. 5) may operate to selectively cover and uncover the arcuate opening 128 to control flow through the fluid passageways 92 and 94, as discussed above. Notably, the exemplary arcuate opening 128 includes curved inner and outer edges 132 and 134, respectively. In certain embodiments, the shape of the aperture 128 is related to the shape of a respective seal ring 84. For instance, in one embodiment, the curved outer edge 134 of the aperture 128 has a rate of curvature that is substantially identical to that of an inner circumference or perimeter of a lip of the seal ring 84 such that a portion of the inner edge or perimeter of the seal ring 84 is substantially coincident with the curved outer edge 134 when pressure within the pressure regulator 24 is substantially equal to the first pressure threshold. In some embodiments, the curved inner edge 132 may have a rate of curvature that is substantially identical to the outer circumference of the seal ring 84. Other configurations in which the curved inner and outer edges 132 or 134 are configured based on other surfaces of the seal ring 84 are also envisaged.

Similarly, a vent seal plates 114 (FIG. 5) may also include an aperture that includes an edge coincident to an edge of a vent seal ring 108 when pressure within the regulator 24 is substantially equal to the second pressure threshold. While the seal plates 90 and 114 may be substantially identical to one another in some embodiments, the apertures of the seal plates 90 and 114 may instead have different sizes or geometries than one another to provide different flow rates through their respective passages and to match differences in the geometries of seal rings 84 and 108.

Figure 10:
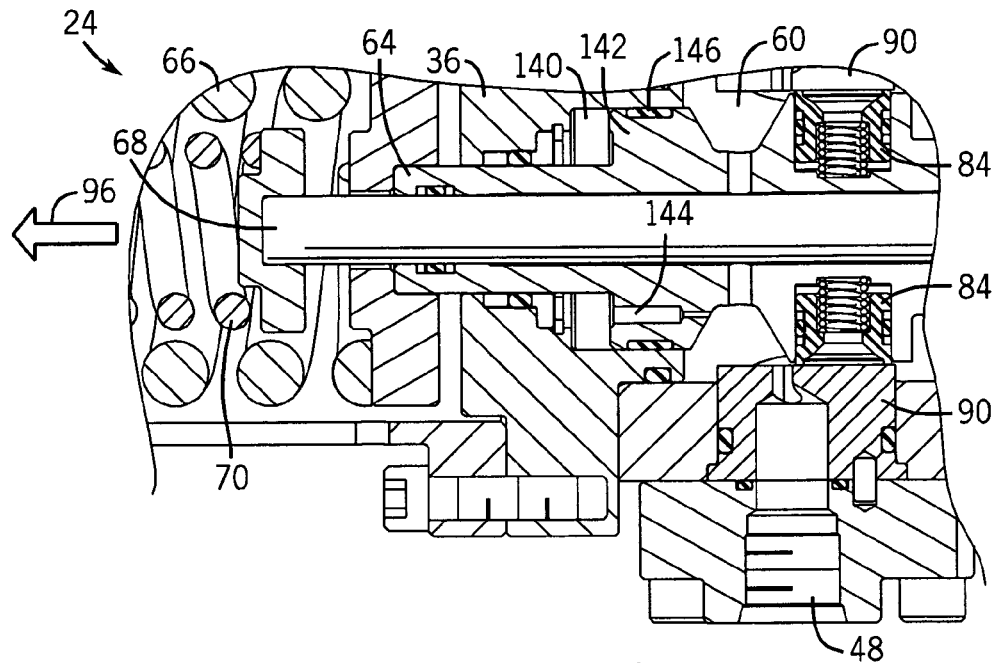
FIG. 10 is a detailed sectional view of the pressure regulator of FIG. 3, illustrating a damping feature disposed within the pressure regulator in accordance with one embodiment of the present invention.

Certain embodiments of the present invention may also include a damping feature, such as that illustrated in FIG. 10, which may enhance stability of the pressure regulator 24. As may be appreciated, sudden increases or decreases in pressure within a system having the exemplary pressure regulator 24 may, in some instances, result in an undesirable level of fluid-structure interaction that decreases stability within the system. The exemplary damping feature illustrated in FIG. 10 may reduce the magnitude of such interaction. In one embodiment, the damping feature includes a recess or damping chamber 140 formed in the end cap 36 and configured to receive a mating feature 142 of the supply piston 64. As will be appreciated, the mating feature 142 may be secured to or integral with the supply piston 64. Notably, the mating feature 142 is configured to fit within the damping chamber 140 and provides an enhanced cross-sectional area that increases drag on the supply piston 64 as it moves within the supply chamber 60. Additionally, in one embodiment, the mating feature 142 includes a surface that is generally perpendicular to the longitudinal axis of the supply piston 64.

For instance, as pressure within the supply chamber increases, the supply piston 64 moves in the direction indicated by arrow 96 and reduces the available space within the damping chamber 140 for the control medium or fluid. Thus, the interaction between movement of the supply piston 64 and the damping chamber 140 forces control fluid within the chamber 140 to either pass through the mating feature 142 via one or more bleed ports 144 or around the outer circumference of the mating feature 142. Further, in one embodiment, a guide ring 146 may be disposed about the outer perimeter of the mating feature 142 to further inhibit flow of the control fluid around the outer perimeter. In one embodiment, the interaction of the damping chamber 140 and the mating feature 142 substantially reduces or prevents the undesirable effects of fluid-structure interaction within the pressure regulator 24.

Figure 11:
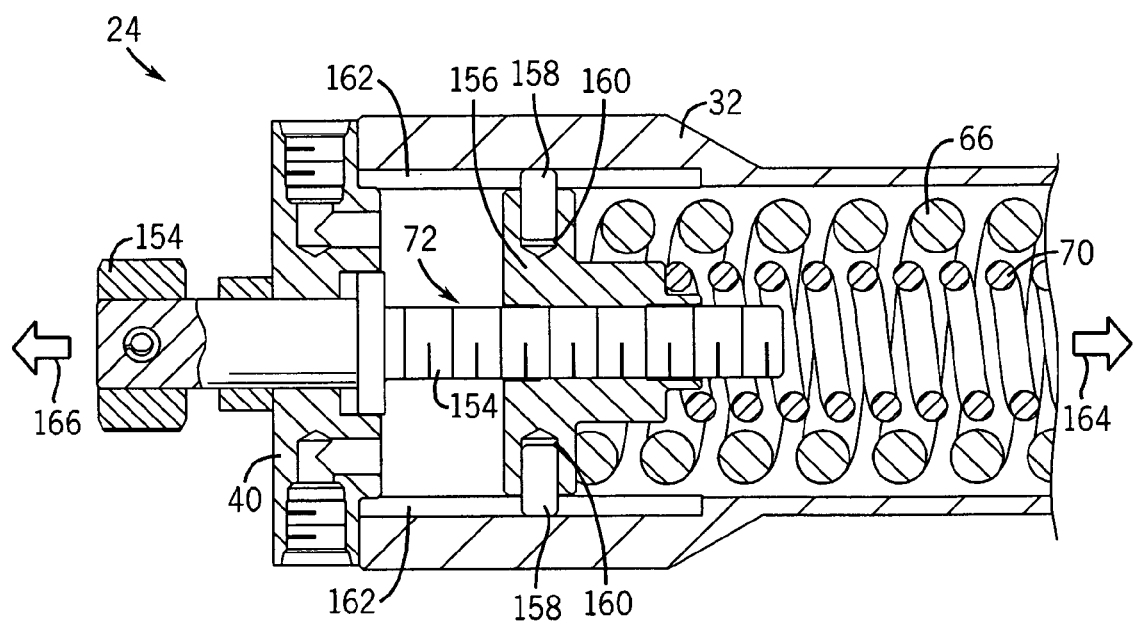
FIG. 11 is a detailed sectional view of the pressure regulator of FIG. 3, illustrating a load spring adjustment mechanism in accordance with one embodiment of the present invention.
Figure 12:
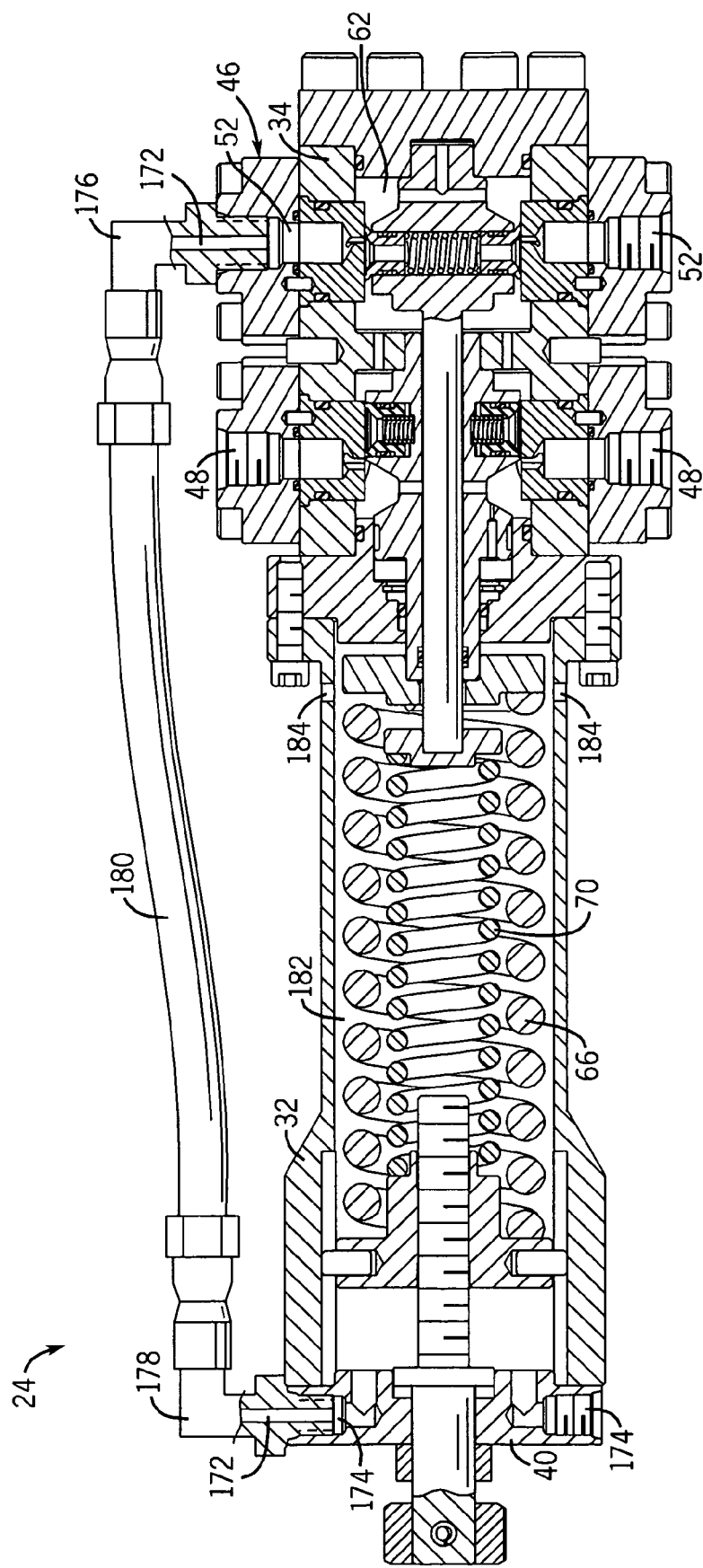
FIG. 12 is a cross-sectional view of an exemplary pressure regulator having an apparatus for flushing a spring chamber within the pressure regulator in accordance with one embodiment of the present invention.

Additionally, one or more embodiments of the present invention may also include an exemplary spring load adjustment mechanism 72, as generally illustrated in FIG. 11. In the presently illustrated embodiment, the adjustment mechanism 72 includes an adjustment screw or member 154 that is coupled to the end cap 40 and extends into the upper housing 32. Further, the adjustment screw 154 includes threads that engage a plunger 156. The exemplary plunger 156 includes dowels or pins 158, disposed within recesses 160, which extend from the plunger 156 and into corresponding slots 162 formed within the upper housing 32. The pins 158 cooperate with the slots 162 to prevent rotation of the plunger 156 within the upper housing 32. The engagement of the adjustment screw 154 with the plunger 156 facilitates the increasing and decreasing of the biasing forces applied to supply and vent piston 64 and 68 (FIG. 3). Particularly, in one embodiment, rotation of the adjustment screw 154 in one direction causes axial motion of the plunger 156 in the direction generally indicated by arrow 164, thereby increasing the biasing forces applied to the pistons by their respective load springs 66 and 70. Similarly, rotation of the adjustment screw 154 in the opposite direction results in an axial movement of the plunger 156 in the direction generally indicated by the arrow 166. Because the plunger 156 includes an anti-rotation feature, rotation of the adjustment screw 154 generally does not transmit a torque to the load springs 66 and 70 or the pistons 64 and 68. In an alternative embodiment, an adjustment mechanism that allows independent adjustment of each of the load springs 66 and 70 is envisaged.

Further, in one embodiment, an exemplary pressure regulator 24 includes an apparatus for flushing the interior of the upper housing 32. Notably, the exemplary pressure regulator 24 includes a fluid conduit 172 that connects a vent port 52 with an inlet port 174 formed in the end cap 40. The fluid conduit 172 may be generally defined by couplings 176 and 178 secured to the vent port 52 and inlet port 174, respectively, and a hose or pipe 180 that extends between the coupling 176 and 178. As the vent ports 52 are opened, the control fluid being vented from the vent chamber 62 may be routed through the fluid conduit 172 and into a chamber 182 in which the load spring 66 and 70 are disposed. As may be appreciated, the fluid injected into the spring chamber 182 may pass through or around the plunger 156, such as through flow ports formed in the plunger 156 or the grooves 162. This pressurized fluid is then routed through the chamber 182 and exits the chamber through the bleed ports 184 disposed at one end of the upper housing 32. In one embodiment related to subsea operation of the exemplary pressure regulator 24, the routing of control fluid through the fluid conduit 172 and the spring chamber 182 may flush sea water from the spring chamber 182, thereby reducing or preventing growth of marine life within the spring chamber 182. In one embodiment, check valves may also be added to the bleed ports 184 to prevent sea water from entering the spring chamber 182.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A pressure regulator comprising:
   a housing including a first inner volume and a second inner volume, the housing having an inlet port and an outlet port to facilitate flow of a control medium through the first inner volume, wherein the housing fluidly isolates the first inner volume from the second inner volume;
   a piston disposed within the first inner volume and responsive to a change in pressure within the first inner volume, wherein the piston is configured to open the outlet port to vent the control medium from the first inner volume if the pressure within the first inner volume reaches a threshold pressure; and
   a conduit external to the housing and extending from the outlet port to an additional inlet port that is in fluid communication with the second inner volume through the housing, wherein the conduit enables fluid communication between the first and second inner volumes such that the control medium vented through the outlet port is routed outside of the housing through the conduit, into the second inner volume from the conduit via the additional inlet port, and out of the second inner volume through a bleed port in an exterior surface of the housing, and wherein the additional inlet port and the bleed port are located at opposite first and second ends of the second inner volume to enable flow of the vented control medium through the second inner volume from the additional inlet port at the first end of the second inner volume, by one or more components disposed within the second inner volume, and out the bleed port at the opposite second end of the second inner volume to flush water from the second inner volume during submerged operation of the pressure regulator.

2. The pressure regulator of claim 1, comprising a plurality of pistons disposed within the first inner volume.

3. The pressure regulator of claim 1, wherein a biasing spring is disposed within the second inner volume.

4. A pressure regulator comprising:
   a housing including a first inner volume and a second inner volume, the housing having an inlet port and an outlet port to facilitate flow of a control medium through the first inner volume, the housing including:
      a first housing portion having the inlet port and the outlet port, and at least partially defining the first inner volume;
      an end cap coupled to the first housing portion; and
      a second housing portion coupled to the end cap and at least partially defining the second inner volume;
   a piston disposed within the first inner volume and responsive to a change in pressure within the first inner volume, wherein the piston extends through the end cap into the second inner volume and the piston is configured to open the outlet port to vent the control medium from the first inner volume if the pressure within the first inner volume reaches a threshold pressure;
   a seal disposed about the piston to facilitate fluid isolation of the second inner volume from the first inner volume while permitting motion of the piston through the end cap; and
   a conduit external to the housing and extending from the outlet port to an additional inlet port that is in fluid communication with the second inner volume through the housing, wherein the conduit enables fluid communication between the first and second inner volumes such that the control medium vented through the outlet port is routed outside of the housing through the conduit, into the second inner volume from the conduit via the additional inlet port, and out of the second inner volume through a bleed port in an exterior surface of the housing.

5. The pressure regulator of claim 4, wherein a first end of the second housing portion is coupled to the end cap, and an opposite second end of the second housing portion is coupled to an additional end cap of the housing.

6. The pressure regulator of claim 5, wherein the bleed port is located at the first end of the second housing portion proximate the end cap, and the additional inlet port is located within the additional end cap.

7. The pressure regulator of claim 4, wherein the pressure regulator is configured to operate in a subsea environment and to expel sea water entering the second inner volume from the subsea environment to inhibit growth of marine life within the second inner volume.

* * * * *